(12) United States Patent
Zhang

(10) Patent No.: US 9,848,103 B2
(45) Date of Patent: Dec. 19, 2017

(54) SYSTEMS AND METHODS FOR GENERATING IMAGES WITH SPECIFIC ORIENTATIONS

(71) Applicant: Chengdu Sioeye Technology Co., Ltd., Chengdu (CN)

(72) Inventor: Shou-chuang Zhang, Chengdu (CN)

(73) Assignee: Chengdu Sioeye Technology Co., Ltd., Chengdu (CN)

( * ) Notice: Subject to any disclaimer, the term of this patent is extended or adjusted under 35 U.S.C. 154(b) by 0 days.

(21) Appl. No.: 15/173,115

(22) Filed: Jun. 3, 2016

(65) Prior Publication Data

US 2016/0373612 A1 Dec. 22, 2016

(30) Foreign Application Priority Data

Jun. 16, 2015 (CN) .................. 2015 1 03321314

(51) Int. Cl.
*H04N 1/387* (2006.01)
*G06T 7/70* (2017.01)
*G06T 3/60* (2006.01)
*G06K 9/32* (2006.01)

(52) U.S. Cl.
CPC ......... *H04N 1/3878* (2013.01); *G06K 9/3208* (2013.01); *G06T 3/60* (2013.01); *G06T 7/70* (2017.01); *H04N 2201/0084* (2013.01)

(58) Field of Classification Search
CPC ...... H04N 1/3877; H04N 1/3878; G06K 9/32; G06K 9/3208; G06K 9/3216; G06K 9/3233–9/3283; G06T 3/60–3/608; G06T 7/70–7/77

See application file for complete search history.

(56) References Cited

U.S. PATENT DOCUMENTS

| | | | |
|---|---|---|---|
| 2012/0033100 A1* | 2/2012 | Harikae | H04N 1/00307 348/223.1 |
| 2016/0205308 A1* | 7/2016 | Maeda | H04N 1/00129 348/207.11 |
| 2016/0255273 A1* | 9/2016 | Wakamatsu | H04N 5/23248 |

* cited by examiner

*Primary Examiner* — Paul Berardesca
(74) *Attorney, Agent, or Firm* — Perkins Coie LLP

(57) ABSTRACT

Methods and associated systems for generating images with objects of interests positioned at pre-determined locations and in specific orientations (e.g., vertical to the horizon) are disclosed. The method includes generating a preview image by an image component and identifying an object of interest in the preview image. The system then determines a desirable view angle at least based on an orientation of the object of interest. The system generates an original image and a current dip angle based on a measurement performed by a tilt sensor. The system calculates an angle of rotation based on the current dip angle and the desirable view angle. The system then edits or adjusts the original image to form an edited or adjusted image that can be presented to a user.

15 Claims, 7 Drawing Sheets

SYSTEMS AND METHODS FOR GENERATING IMAGES WITH SPECIFIC ORIENTATIONS

CROSS-REFERENCE TO RELATED APPLICATIONS

This application claims the benefit of Chinese Patent Application No. 2015103321314, filed Jun. 16, 2015 and entitled "A SYSTEM AND METHOD FOR KEEPING REAL-TIME RECORDING IMAGES VERTICAL," the contents of which are hereby incorporated by reference in its entirety.

BACKGROUND

Motion cameras or sports cameras are widely used in various fields such as collecting images for outdoor events or natural/geographical observations. Motion cameras are also used for important events such as large ceremonies. Collecting images while a motion camera is moving usually results in tilted images, which can cause inconvenience or problems when a user later wants to use these tilted images. Corrections or further edits of these tilted collected images are usually time consuming and expensive. Some people tried to resolve this problem by rotating the camera by certain mechanical systems (such as a ball head or a cradle head attached to the camera) while the camera is operating. However, these mechanical systems are relatively slow in response to the movement of the camera and can be expensive. Therefore, it is advantageous to have methods and associated systems that can effectively and efficiently address this problem.

BRIEF DESCRIPTION OF THE DRAWINGS

Embodiments of the disclosed technology will be described and explained through the use of the accompanying drawings.

Figure 1:
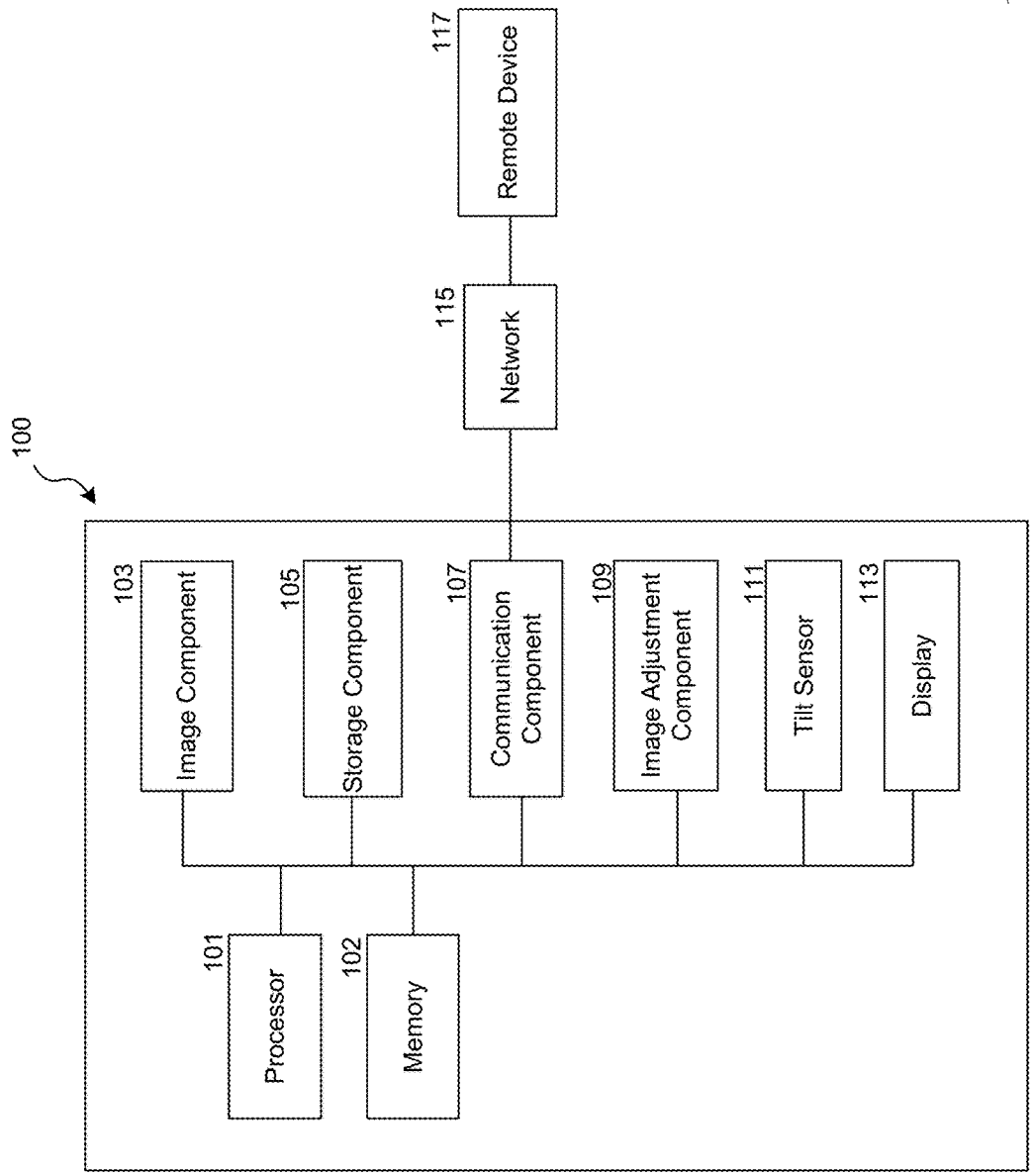
FIG. 1 is a schematic diagram illustrating a system in accordance with embodiments of the disclosed technology.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "some embodiment", "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The present disclosure provides a camera system that can generate images in desirable orientations from certain view angles. More particularly, for example, the camera system can keep captured images in an orientation vertical to the horizon. In some embodiments, the term "view angle" can refer to an angle between a content-related orientation of an image and a reference orientation. For example, the "content-related orientation of an image" can be an orientation indicated by an in-picture object. The in-picture object can have an axis that forms a 60-degree angle with the horizon. The "reference orientation" can be an orientation that is vertical (i.e., forming a 90-degree angle) to the horizon. In this example, the "view angle" can be a 30 degree angle relative to the horizon. In some embodiments, the camera system enables a user to determine the desirable view angle based on an orientation of an object of interest (e.g., a person, an item, an animal, etc.) in preview images. In such embodiments, the camera system can first generate a preview image of the object of interest and let the user decide which view angle is desirable. For example, the object of interest can have an orientation of 45 degrees to a particular border line (e.g., the horizontal border line) of the preview image. The user may find this 45-degree orientation desirable and then the camera system can start to generate images of the object of interest in which the object of interest is presented in this desirable orientation. By doing so, the camera system can generate customized images for the user and save a significant amount of time for further image editing or processing.

In some embodiments, the camera system can include a tilt sensor configured to measure a current dip angle (i.e., inclination of a geological plane down from the horizon) of the camera system. The camera system can also include an image adjustment component configured to adjust captured images in a real-time fashion based on the measured current dip angle and the desirable view angle (e.g., edit the captured images based on a predetermined algorithm associated with the current dip angle and the desirable view angle). By this arrangement, the camera system can instantaneously provide a user with ready-to-use captured images in a fixed desirable view angle. As a result, the camera system can provide a user with real-time images in a predetermined orientation, such that these images are ready-to-use without further edits (e.g., no need to convert the images to fit a specific format).

FIG. 1 is a schematic diagram illustrating a camera system 100 in accordance with embodiments of the disclosed technology. The camera system 100 includes a processor 101, a memory 102, an image component 103, a storage component 105, a communication component 107, an image adjustment component 109, a tilt sensor 111, and a display 113. The processor 101 is coupled with and configured to control other components of the camera system 100. The memory 102 is coupled to the processor 101 and configured to store information (e.g., instructions, images, etc.) associated with the camera system 100. The image component 103 is configured to capture real-time images and can include an image sensor array (e.g., a CMOS sensor or a CCD sensor) and a group of lens. The storage unit 105 is configured to store measured information, captured images, edited captured images, statuses of the components, etc. The communication component 107 is configured to communicate with a remote device (e.g., a smartphone, a remote server, etc.) 117 via a network (e.g., a wired or wireless network) 115. The display 113 is configured to visually present captured and/or edited images to a user.

The tilt sensor 111 is configured to measure a set of predetermined parameters of the system 100 such that the processor 101 can calculate a dip angle of the system 100. In some embodiments, the tilt sensor 11 can be mounted on or built in the camera system 100. The tilt sensor 111 is configured to provide a dip angle signal that indicates a (real-time) dip angle of the camera system 100. In some embodiments, the tilt sensor 111 can be a 2-axis tilt sensor (as discussed in detail below with reference to FIGS. 3A and 3B). The tilt sensor can sense the rotation and movement of the system 100 and transmit associated signals (e.g., an accelerating signal and an angular signal) to the processor 101. In some embodiments, these signals can be transmitted in a real-time fashion. Accordingly, the processor 101 can generate a dip angle signal to indicate a dip angle of the camera system 100 based on the signals generated by the tilt sensor 111. The processor 101 can then calculate an angle of rotation (e.g., a two-dimensional angle) based on the dip angle (e.g., a three-dimensional angle). The calculations between the dip angle and the angle of rotation will be discussed in detail below with reference to FIGS. 3A and 3B.

In some embodiments, the tilt sensor 111 can include a gravity sensor configured to sense the acceleration of the system 100 and a gyroscope configured to sense the rotation of the system 100. The gravity sensor can generate an accelerating signal and the gyroscope can generate an angular signal. The generated accelerating signal and the angular signal can be transmitted to the processor 101 for further process. Algorithms for calculating the dip angle based on the accelerating signal and the angular signal include, for example, Kalman Filtering or linear quadratic estimation (LQE). After receiving these signals, the processor 101 can then generate a dip angle signal to indicate a dip angle of the camera system 100 based on the accelerating signal and the angular signal (e.g., by Kalman Filtering algorithm). One with ordinary skills in the art would understand that, in other embodiments, the tilt sensor 111 is not limited by the above-described structure. As an example, the tilt sensor 111 can alternatively include an inclinometer or a magnetometer (e.g., use a magnetic field to determine a direction).

In some embodiments, the tilt sensor 111 can include an independent processor. In such embodiments, the generated signals (e.g., accelerating and angular signals) can be transmitted to the independent processor, and the independent processor (rather than the processor 101) will generate a dip angle signal to indicate a dip angle of the camera system 100 based on the received signals.

When the angle of rotation is derived, the processor 101 can transmit a signal indicating the angle of rotation to the image adjustment component 109. The image adjustment component 109 can then edit or adjust captured images based on the angle of rotation such that an object of interest presented in the edited images can be in a desirable orientation (e.g., vertical to a horizontal border line of the captured images). In some embodiments, for example, the image adjustment component 109 can cut a portion out of the captured images so as to form edited images with an object of interest in a desirable orientation. Examples of the edited images will be discussed below with reference to FIG. 3C.

Figure 2:
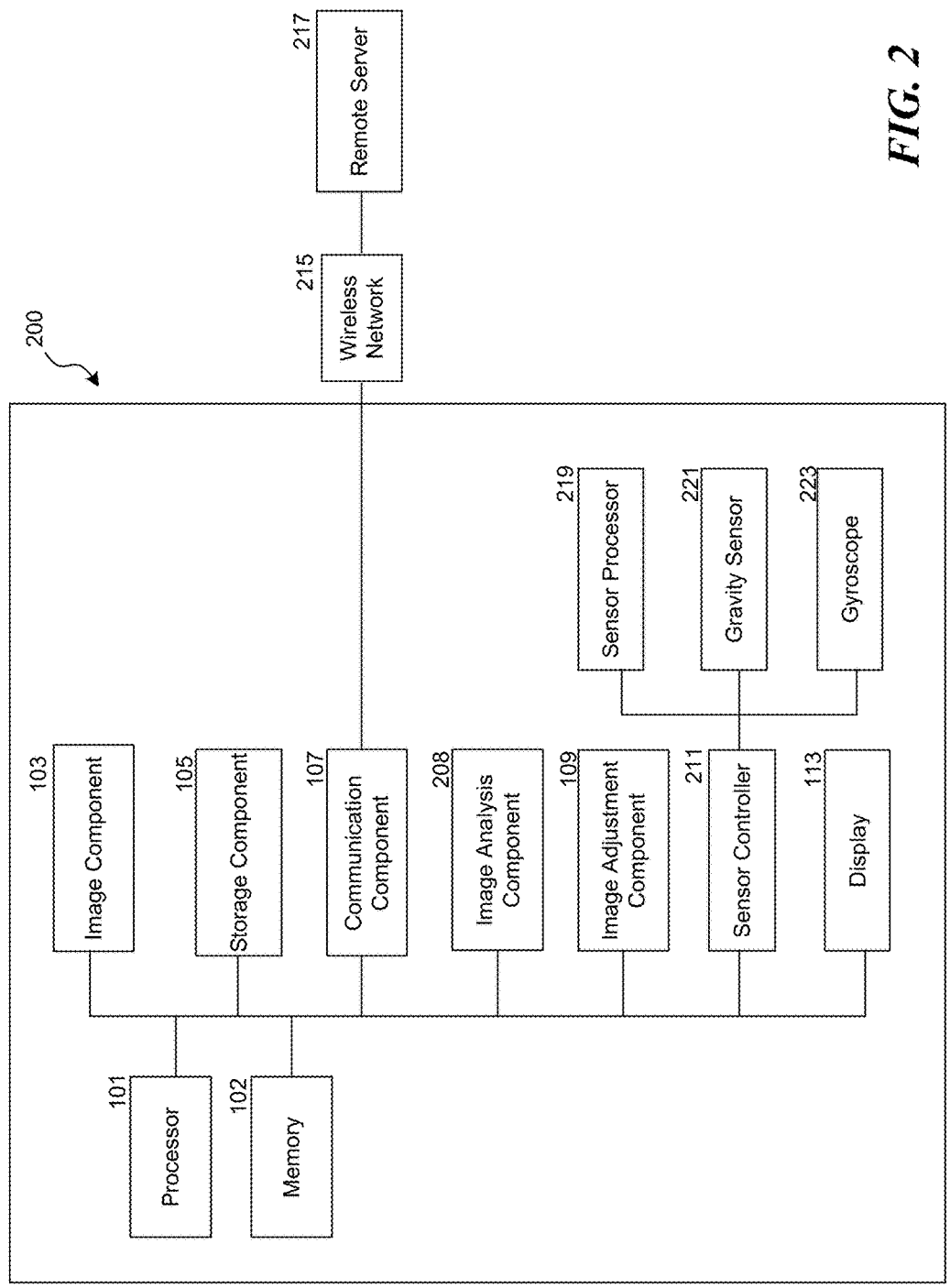
FIG. 2 is a schematic diagram illustrating a system in accordance with embodiments of the disclosed technology.

FIG. 2 is a schematic diagram illustrating another camera system 200 in accordance with embodiments of the disclosed technology. As shown, the camera system 200 can include the processor 101, the memory 102, the image component 103, the storage component 105, the communication component 107, an image analysis component 208, the image adjustment component 109, a sensor controller 211 (coupled to a sensor processor 219, a gravity sensor 221, and a gyroscope 223), and the display 113. The sensor controller 211 is configured to control and interface with the sensors attached thereto (in the illustrated embodiments, the gravity sensor 221 and the gyroscope 223). The image analysis component 208 is configured to analyze images collected by the image component 103. For example, the image analysis component 208 can identify an object of interest in the collected images based on a pixel-by-pixel comparison. In some embodiments, the image analysis component 208 can analyze the orientation of an identified object of interest. For example, the image analysis component 208 can determine that a person presented in a collected image (e.g., a preview image) has a 60-degree orientation (e.g., a vertical axis of the object of interest and a horizontal border line of the collected image together form a 60-degree angle).

Compared to the embodiments discussed in FIG. 1 above, the sensor processor 219 (rather than the processor 101) can control the sensors attached thereto and process signals from these sensors. In some embodiments, the sensor processor can communicate with the processor 101 through the sensor controller 211. In some embodiments, the sensor processor receives an accelerating signal from the gravity sensor 203 and an angular signal from the gyroscope 205. The sensor processor 219 then generates a dip angle signal to indicate a dip angle of the camera system 200 based on the accelerating signal and the angular signal. The sensor processor 219 can further calculate an angle of rotation based on the dip angle. In other embodiments, however, the angle of rotation can be calculated by the processor 101.

When the angle of rotation is derived, the sensor processor 219 can transmit a signal indicating the angle of rotation to the image adjustment component 109. The image adjustment component 109 can then edit captured images based on the angle of rotation such that an object of interest presented in the edited images is in a desirable orientation (e.g., vertical to a horizontal border line of the captured images). In some embodiments, for example, the image adjustment component 109 can cut a portion out of the captured images so as to form edited images with an object of interest in a desirable orientation. Examples of the edited images will be discussed below with reference to FIG. 3C.

Figure 3A:
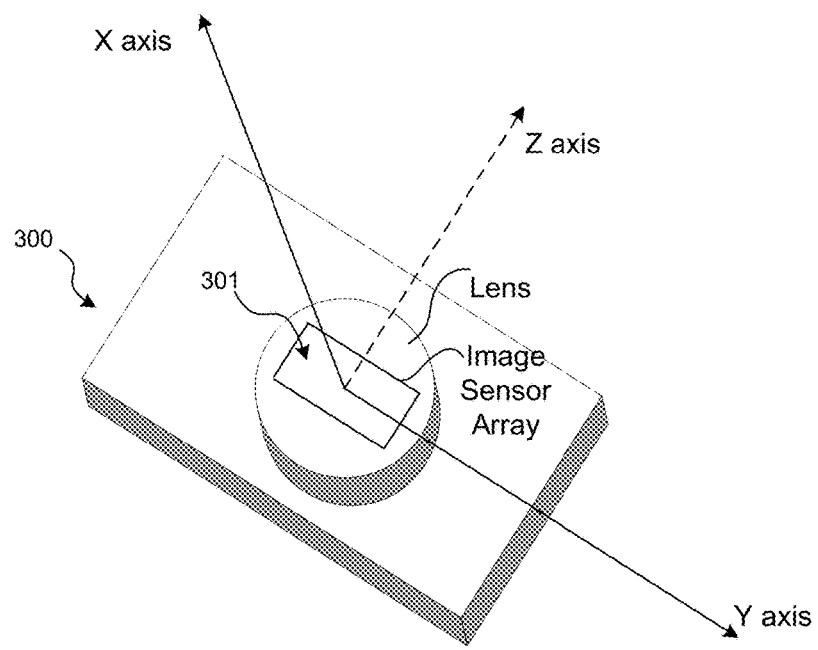
FIGS. 3A and 3B are schematic diagrams illustrating how to calculate an angle of rotation based on a dip angle.
Figure 3B:
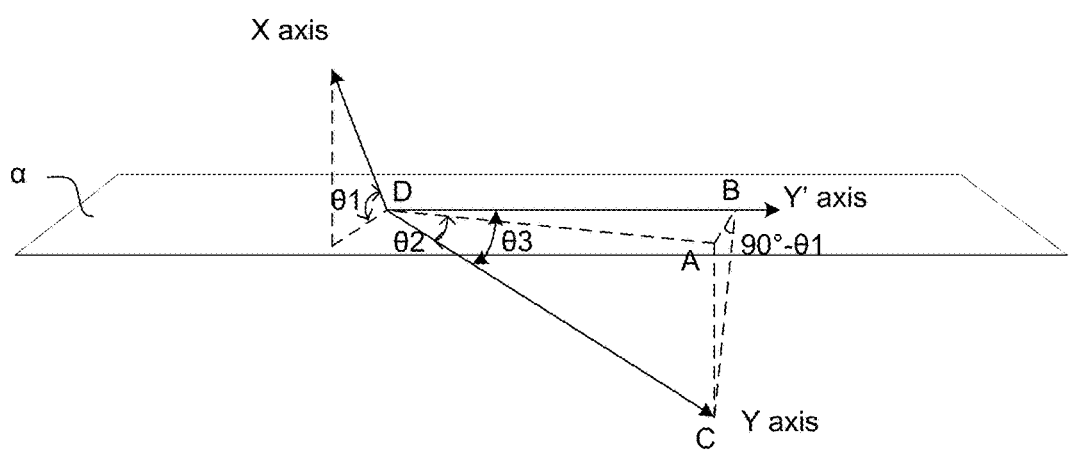

FIGS. 3A and 3B illustrate how to calculate an angle of rotation based on a dip angle. In FIG. 3A, two measuring axes (i.e., X axis and Y axis) corresponding to a 2-axis tilt sensor are defined for a dip angle measurement. The X axis is perpendicular to a focal plane 301 of a camera system 300 (i.e. where the image sensor array is located). As shown, the Y axis is in the focal plane 301 and parallel to a bottom edge (i.e., the long edge shown in FIG. 3A) of the image sensor array. One with ordinary skills in the art would know that the above definition of the axes is for an illustrative purpose and not intended to limit the present disclosure. In other embodiments, the Y axis can be parallel to a side edge (i.e., the short edge shown in FIG. 3A) of the image sensor array. In some embodiments, the number of measuring axes can vary according to the types or models of the sensors used in the camera system 300.

A dip angle signal can include two components that indicate a first dip angle θ1 and a second dip angle θ2 respectively. As shown in FIG. 3B, the first dip angle θ1 represents an angle between the X axis and the horizontal plane (i.e., plane α). The second dip angle θ2 represents an angle between the Y axis and the horizontal plane. Both θ1 and θ2 are acute angles (no larger than 90 degrees). As shown in FIG. 3B, Point C is a point on the Y axis. Point A is the vertical projection of Point C on the horizontal plane. Point D is the intersection of the X axis and Y axis. Y' axis is defined by the intersection between the horizontal plane and the focal plane. Dash line BC is perpendicular to the Y' axis. The angle of rotation θ3 is consequently defined as the angle between the Y axis and the Y' axis.

Since Point A is the vertical projection of point C on the horizontal plane, dash line AC is perpendicular to the horizontal plane. Accordingly, angle ABC is the dihedral angle between the horizontal plane and the focal plane. Also, angel ABC is (90−θ1) degrees. Therefore, the following equations explain the relationships among angles θ1, θ2, and θ3.

$$\sin \theta 2 = \frac{AC}{CD} \quad (1)$$

$$\sin(90° - \theta 1) = \frac{AC}{BC} \quad (2)$$

$$\sin \theta 3 = \frac{BC}{CD} \quad (3)$$

Accordingly, angle θ3 can be calculated based on angles θ1 and θ2. For example:

$$\sin \theta 3 = \frac{\sin \theta 2}{\sin(90° - \theta 1)} \quad (4)$$

$$\theta 3 = \arcsin\left[\frac{\sin \theta 2}{\sin(90° - \theta 1)}\right], (-90° < \theta 3 < 90°) \quad (5)$$

According to geometry, the dihedral angle ABC is larger than angle θ2. Therefore the equation (5) always has a real root for the angle of rotation θ3.

In some embodiments, when a calculated angle of rotation θ3 is less than or equal to 45 degrees, the camera system 300 can adjust the captured image by rotating the image by θ3 degrees. When the calculated angle of rotation θ3 is larger than 45 degrees, the camera system 300 can adjust the captured image by rotating the image by (90−θ3) degrees.

Figure 3C:
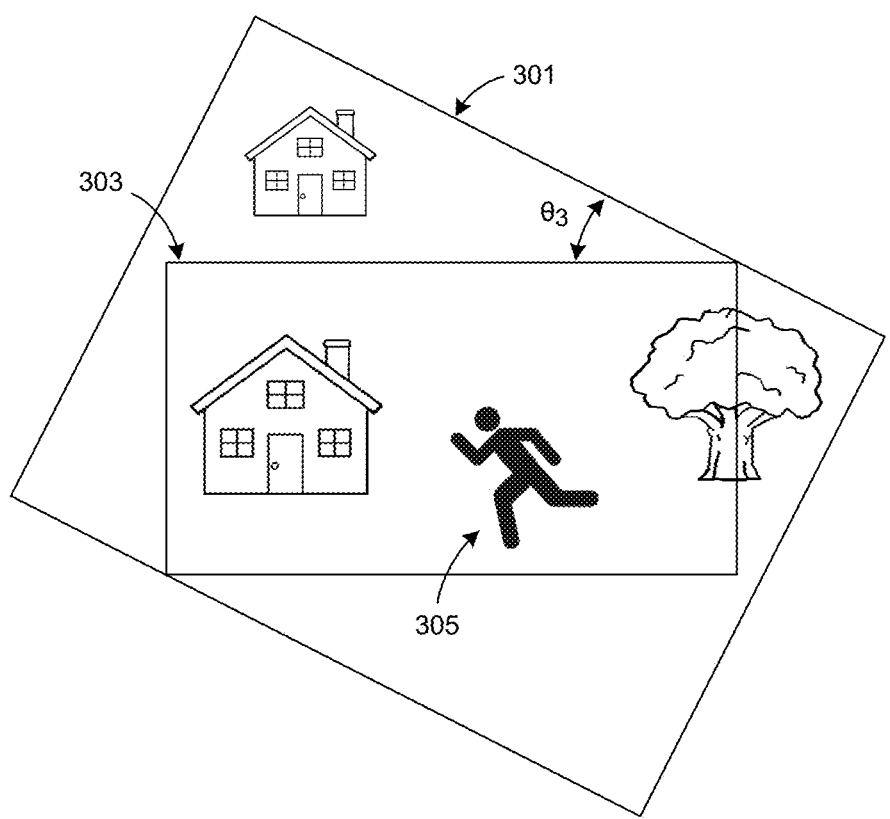
FIG. 3C is a schematic diagram illustrating an originally-captured image and an edited image in accordance with embodiments of the disclosed technology.

FIG. 3C is a schematic diagram illustrating an originally-captured image (e.g., a preview image) 301 and an edited or adjusted image 303 in accordance with embodiments of the disclosed technology. As shown in FIG. 3C, the originally-captured image 301 illustrates an image captured by the image component 103. The originally-captured image 301 includes an object-of-interest (e.g., a person, a structure, a moving object, etc.) 305. Due to the movement of the camera drone 100, the object-of-interest 305 in the originally-captured image 301 may not be in a desirable view angle. For example, a user may want to have a picture or a person that is vertical to the horizon. However, the person in an originally-captured image can be tilted. In such case, the camera system 300 can calculate the angle of rotation θ3 of the camera system 300, and then edit the originally-captured image 301 accordingly. In the illustrated embodiment shown in FIG. 3, the edited image 303 is generated by cutting a portion out of the originally-captured image 301. As shown, the originally-captured image 301 and the edited image 303 form an angle equal to the angle of rotation θ3 (in some embodiments, an angle with (90−θ3) degrees). Therefore, the bottom edge of the edited image 303 is parallel to the horizontal plane. As a result, the camera system 300 can provide a user with edited images having a predetermined view angle on a real-time basis. In some embodiments, the predetermined view angle can be set as vertical to the horizon. In other embodiments, however, the predetermined view angle can be configured based on user's preferences (e.g., a desirable view angle based on user's preference regarding how to observe an object of interest).

In some embodiments, the camera system 300 can first identify the object-of interest 305 in the originally-captured image 301 and continuously tracking it, so as to make sure that the object-of interest 305 is in a center portion of the edited image 303. In some embodiments, the edited image 303 can be generated by a predetermined algorithm, suitable computer-implementable software/firmware, suitable applications, etc.

Figure 4:
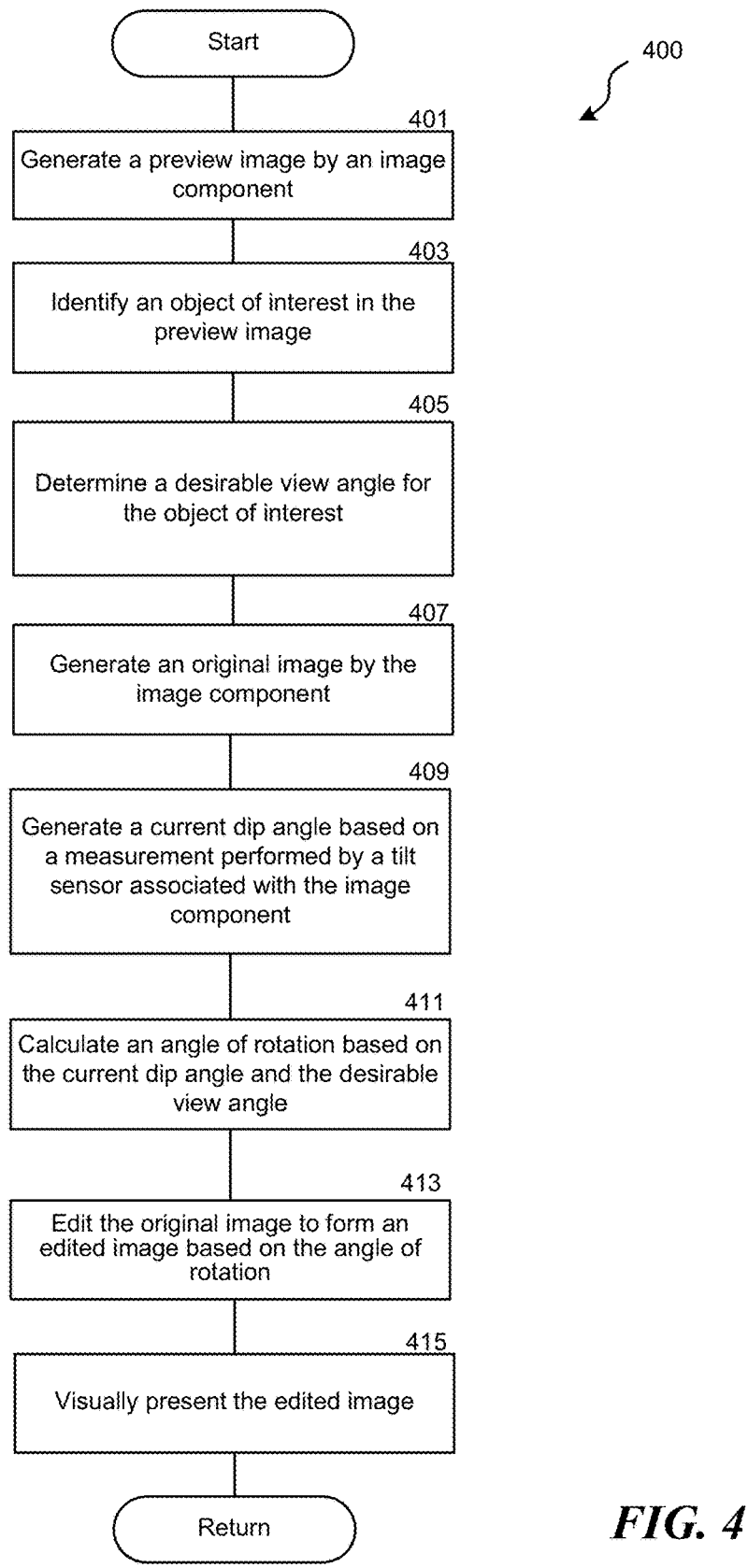
FIG. 4 is a flowchart illustrating a method in accordance with embodiments of the disclosed technology.

FIG. 4 is a flowchart illustrating a method 400 in accordance with embodiments of the disclosed technology. The method 400 can be implemented by a system such as the camera system 100, 200, or 300 as described above. The method 400 starts at block 401 by generating a preview image by an image component at block 401. At block 403, the system can identify an object of interest in the preview image. In some embodiments, the object of interest can be identified by analyzing the preview image performed by an image analysis component (e.g., the image analysis component 208). At block 405, the system can determine a desirable view angle α' for the object of interest. In some embodiments, the system can determine the desirable view angle α' based on a user input. For example, a user may want to have a 60-degree angle to the horizon as the desirable view angle (in other words, an axis of the object of interest in image forms a 60-degree angle relative to the horizon). In some embodiments, the system can provide a list of recommended view angles for a system user to select. At block 407, the system generates an original image by the image component in the desirable view angle. At block 409, the method 400 continues by generating a current dip angle β based on a measurement performed by a tilt sensor associated with the image component. The current dip angle β may change due to a relative movement between the object of interest and the system. In the illustrated embodiment, the tilt sensor can be a 2-axis tilt sensor. In other embodiments, however, the tilt sensor can be other suitable sensors. The current dip angle β is generated in accordance with a first dip angle θ1 and a second dip angle θ2. Please refer to the descriptions above with reference to FIG. 3B for the definitions of the first dip angle θ1 and the second dip angle θ2. The current dip angle β can be generated or calculated based on the following equation:

$$\beta = \arcsin\left[\frac{\sin \theta 2}{\sin(90° - \theta 1)}\right], (90° < \beta < 90°) \quad (6)$$

It should be noted that in other embodiments, the current dip angle β can be generated based on various factors depending on the types and/or corresponding configurations of the tilt sensor. In some embodiments, the system can measure and generate the current dip angle β intermittently (e.g., once per 0.1 to 30 seconds).

At block 411, the system then calculates an angle of rotation based on the current dip angle β and the desirable view angle α'. In some embodiments, the angle of rotation can be a weighted average angle of the current dip angle β and the desirable view angle α'. The weighting parameters can be determined by a characteristic or category of the object of interest. For example, when the object of interest is a human face, the weighting parameters of the current dip angle β and the desirable view angle can be both set to 50%. Accordingly, the angle of rotation θ3 can be calculated based on the desirable view angle α' and the current dip angle β, as indicated in the following equation:

$$\theta 3 = 0.5\alpha' + 0.5\beta \quad (7)$$

By so doing, the system can generate the angle of rotation in a customized and flexible way. To illustrate, two examples are given below. In the first example, the angle of rotation (i.e., the parameter that the system uses to adjust images) is generated only based on the current dip angle β (i.e., the weighting parameter for the desirable view angle α' is zero and the weighting parameter for the current dip angle β is 100%). In the second example, the angle of rotation is generated based on the desirable view angle α' and the current dip angle β, each with a 50% weighting.

In the first example, a user may set the desirable view angle α' as 30 degrees relative to the horizon. The object of interest in this example can be an athlete standing on the ground, forming an 80-degree angle with the horizon. At a first time point, the image component can be positioned in parallel to the horizon (i.e., the initial dip angle is zero). The image component can generate an original image with the athlete therein forming an 80-degree angle with the horizontal boarder line of the original image. The system can adjust the original image by rotating it by 50 degrees (80-30) such that the athlete is presented in the adjusted image in the orientation (i.e., 30 degrees relative to the horizon) in accordance with the desirable view angle α'. After a while, the image component has moved/rotated (e.g., by a drone device) relative to the athlete. At a second time point, the current dip angle β is now 20-degree (i.e., the image component is tilted by 20 degrees). The system then decides that the angle of rotation is 20-degree based on the current dip angle β alone. Accordingly, the system can re-adjust the adjusted image by rotating it by 20 degrees.

In the second example, a user may set the desirable view angle α' as 20 degrees relative to the horizon. The object of interest in this example can be an artist standing on a stage, forming a 70-degree angle with the horizon. At a first time point, the image component can be positioned in parallel to the horizon (i.e., the initial dip angle is zero). The image component can generate an original image with the artist therein forming a 70-degree angle with the horizontal boarder line of the original image. The system can adjust the original image by rotating it by 50 degrees (70-20) such that the athlete is presented in the adjusted image in the orientation (e.g., 20 degrees relative to the horizon) in accordance with the desirable view angle α'. After a while, the image component has moved/rotated (e.g., by a drone device) relative to the artist. At a second time point, the current dip angle β is now 30-degree (i.e., the image component is tilted by 30 degrees). In this embodiment, the system calculates the angle of rotation by weighting the desirable view angle α' and the current dip angle β. Accordingly, the system decides that the angle of rotation is 25-degree (20*50%+ 30*50%=25). Accordingly, the system can re-adjust the adjusted image by rotating it by 25 degrees.

In some embodiments, the weighting parameter for the current dip angle β can vary depending on the types of the object of interest. For example, when the object of interest is a building, the weighting parameter of the current dip angle β can be set as 100% (and therefore the desirable view angle α' is ignored when calculating the angle of rotation θ3). In some embodiment, the angle of rotation can be selected by a user. In some embodiments, the angle of rotation can be zero (e.g., no relative rotation between the object of interest and the system). At block 413, the method 400 continues by editing the original image to form an edited image based on the angle of rotation. At block 415, the system then visually presents the edited image. The method 400 then returns.

Figure 5:
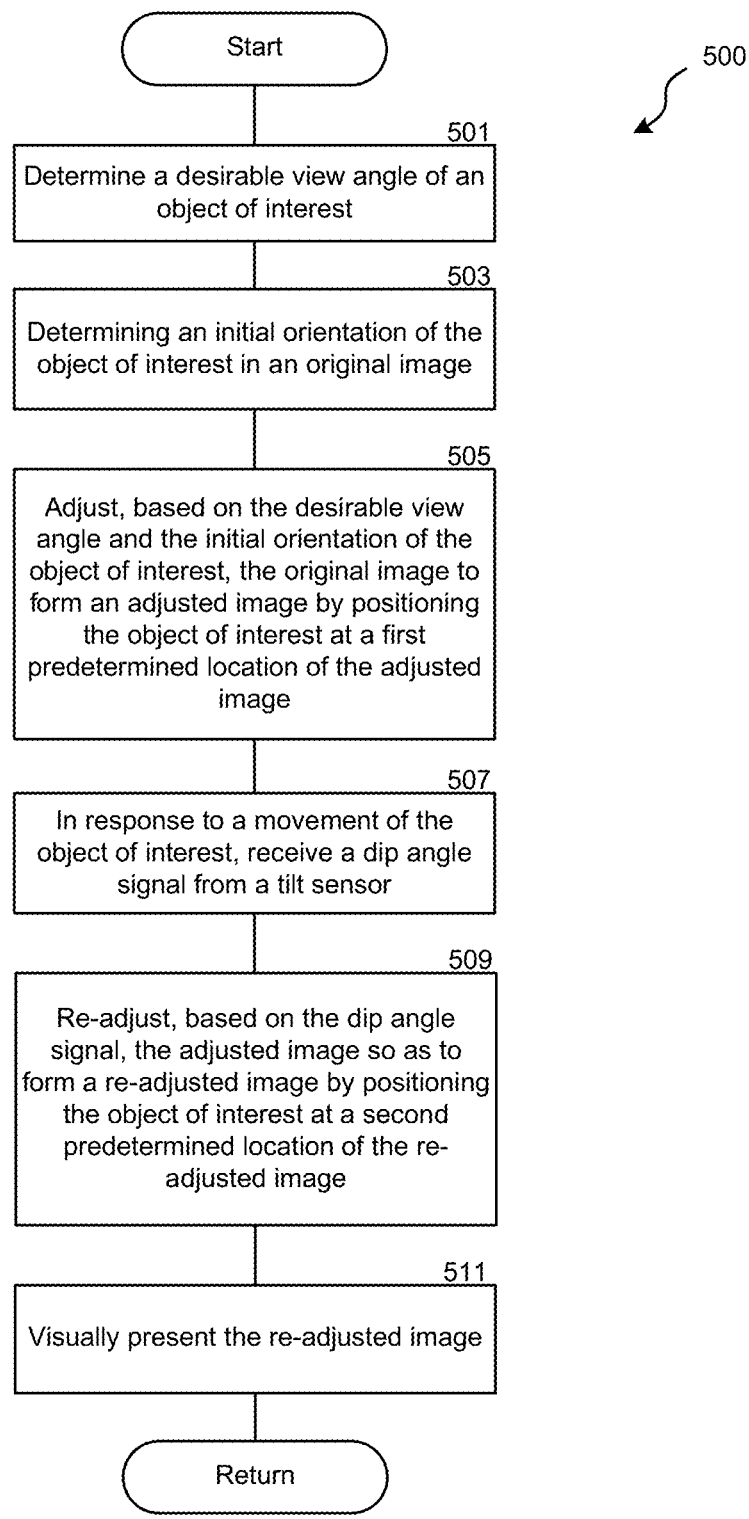
FIG. 5 is a flowchart illustrating a method in accordance with embodiments of the disclosed technology.

FIG. 5 is a flowchart illustrating a method 500 in accordance with embodiments of the disclosed technology. The method 500 can be implemented by a system such as the camera system 100, 200, or 300 as described above. The method 500 starts at block 501 by determining a desirable view angle of an object of interest. At block 503, the system determines an initial orientation of the object of interest in an original image. In some embodiments, the initial orientation of the object of interest is determined by an image analysis component. At block 505, the system adjusts, based on the desirable view angle and the initial orientation of the object of interest, the original image to form an adjusted image by positioning the object of interest at a first predetermined location (e.g., a lower center portion) of the adjusted image. The method 500 continues to block 507 and the system receives a dip angle signal from a tilt sensor, in response to a movement of the object of interest (e.g., a relative movement between the system and the object of interest). At block 509, the system re-adjusts, based on the dip angle signal, the adjusted image so as to form a re-adjusted image by positioning the object of interest at a second predetermined location (e.g., an upper center portion) of the re-adjusted image. At block 511, the system then visually presents the re-adjusted image. The method 500 then returns. The method 500 enables a system user to dynamically positioning an object of interest at desirable locations in the collected images during the image collection process.

Figure 6:
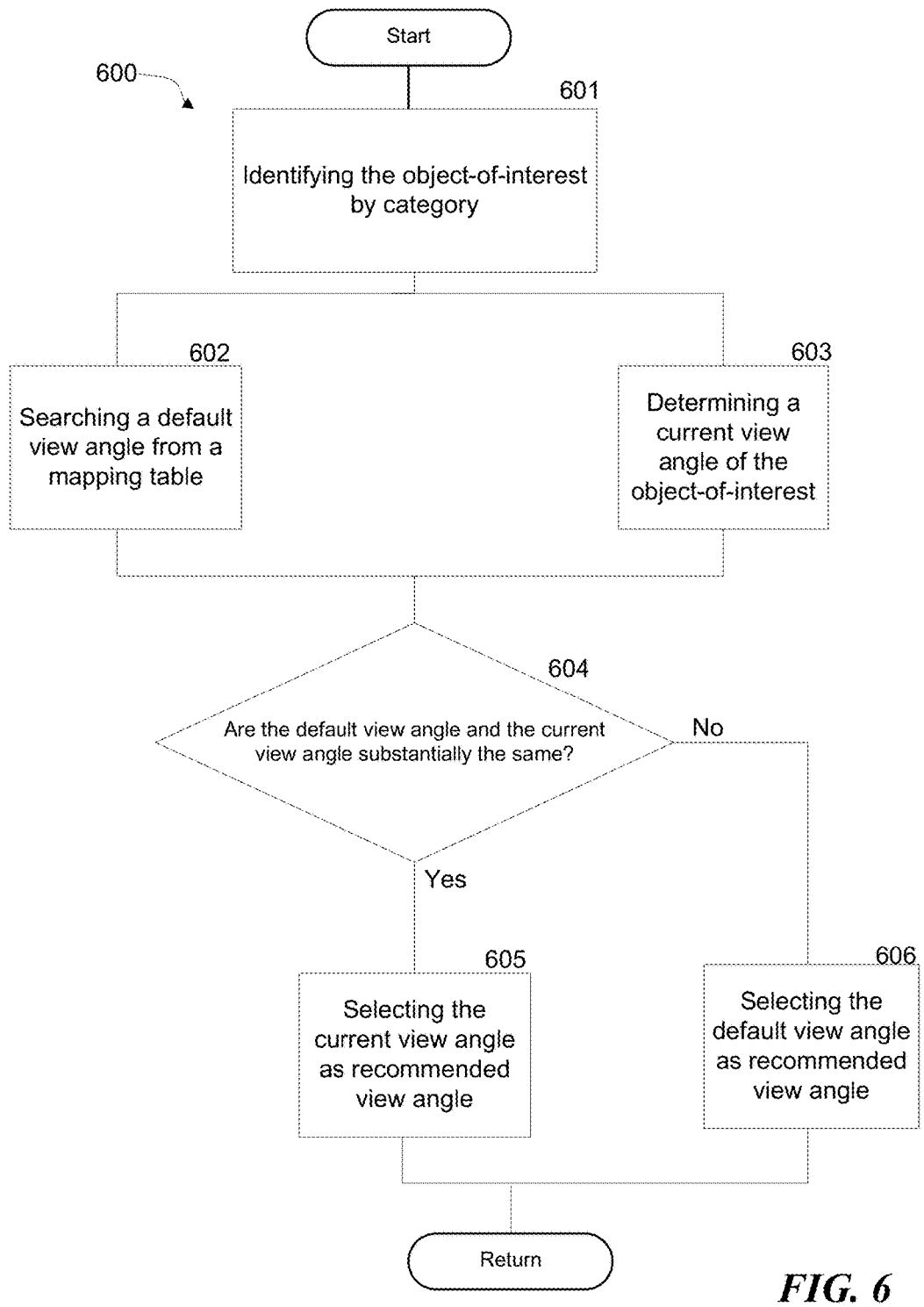
FIG. 6 illustrates a process flow of determining a recommended view angle according to an embodiment of the disclosed technology.

FIG. 6 illustrates a process flow 600 of determining a recommended view angle according to an embodiment of the present disclosure. In some embodiments, the process flow 600 can be implemented with the methods for generating images with objects of interests positioned at pre-determined locations and/or in specific orientations in accordance with the present disclosure (such as the method 400 or 500). The process flow 600 can be implemented by a system such as the camera system 100, 200, or 300 as described above. As shown in FIG. 6, at block 601, the object-of-interest may be firstly identified by category. For example, the system can determine that which category the object-of interest relates to. Examples of the categories include a human face, a portrait, an animal, a building, a structure, etc. The identification of the object-of-interest can be performed by an image analysis component (e.g., the image analysis component 208 discussed above). At block 602, according to the result of the identification of the object-of-interest, the system then searches a default view angle of the object-of-interest from a mapping table which records object categories and corresponding default view angles. In one embodiment, the mapping table is pre-generated and saved in the storage component 105.

At block 603, the system determines a current view angle of the object-of-interest. In the illustrated embodiments, the processes described in block 602 and block 603 can be implemented in parallel. In other embodiments, the processes described in block 602 and block 603 can be performed in different orders (e.g., performing the process described in block 602 first or vice versa). The current view angle can be determined according to geometric characteristics of the determined object-of-interest category. For example, in one embodiment, when the object-of interest is identified as a human face, the system can identify a bilateral symmetry axis of the determined face. An angle between the bilateral symmetry axis and the horizontal bottom edge of the preview image is defined as the current view angle. An ordinary skilled artisan should understand that the definition of the current view angle can vary depending on different object-of-interest categories.

At block 604, a comparison is made to detect if the default view angle and the current view angle are substantially the same. For example, in one embodiment, when the difference between the default view angle and the current view angle is no larger than a threshold (e.g., a difference between the default view angle and the current view angle is lower than 5 degrees), the default view angle and the current view angle are considered to be substantially the same. The threshold can vary depending on different object-of-interest categories (e.g., a threshold for a human face can be smaller than one for a building). If the two view angles are determined as substantially the same, then at block 605, the current view angle can be selected as the recommended view angle. Otherwise, if the two view angles are determined as not substantially the same, then at block 606, the default view angle can be selected as the recommended view angle. The process flow 600 then returns. Providing the recommended view angle to a user enables the user to effectively collect images that he/she desires.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A method for generating an image, the method comprising:
    generating a preview image by an image component;
    identifying an object of interest in the preview image;
    providing a recommended view angle for a desirable view angle in the preview image,
    determining the desirable view angle for the object of interest in the preview image;
    generating an original image by the image component in the desirable view angle;
    generating a current dip angle based on a measurement performed by a tilt sensor associated with the image component;
    calculating an angle of rotation based on the current dip angle and the desirable view angle;
    editing the original image to form an edited image based on the angle of rotation; and
    visually presenting the edited image;
    wherein the recommended view angle is generated by:
        identifying a category of the object-of-interest;
        searching a default view angle from a mapping table based on the category;
        determining a current view angle associated with the object-of-interest; and
        analyzing, based on a threshold value, the default view angle and the current view angle.

2. The method of claim 1, wherein the object-of-interest is positioned in a center portion of the edited image.

3. The method of claim 1, further comprising transmitting the edited image to a remote server.

4. The method of claim 1, further comprising visually presenting the edited image on a real-time basis.

5. The method of claim 1, wherein identifying the object-of-interest in the preview image includes identifying the object-of-interest in the preview image based on a pixel-by-pixel comparison.

6. The method of claim 1, wherein the edited image is formed by cutting a portion of the original image.

7. The method of claim 1, wherein the tilt sensor includes a processor, a gravity sensor, and a gyroscope.

8. The method of claim 7, further comprising:
    generating an accelerating signal by the gravity sensor;
    generating an angular signal by the gyroscope;
    generating a dip angle signal by the tilt sensor based on the accelerating signal and the angular signal; and
    generating the current dip angle based on the dip angle signal.

9. The method of claim 1, wherein the tilt sensor is a 2-axis tilt sensor.

10. The method of claim 1, wherein the tilt sensor includes an inclinometer.

11. The method of claim 1, wherein the tilt sensor includes a magnetometer.

12. A method for managing an orientation of an object of interest in an image, the method comprising:
    determining a desirable view angle of the object of interest;
    determining an initial orientation of the object of interest in an original image;
    adjusting, based on the desirable view angle and the initial orientation of the object of interest, the original image so as to form an adjusted image by positioning the object of interest at a first predetermined location of the adjusted image;
    in response to a movement of the object of interest, receiving a dip angle signal from a tilt sensor;
    re-adjusting, based on the dip angle signal, the adjusted image so as to form a re-adjusted image by positioning the object of interest at a second predetermined location of the re-adjusted image; and
    visually presenting the re-adjusted image;
    wherein the desirable view angle is determined based on a recommended view angle, and
    wherein the recommended view angle is generated by:
        identifying a category of the object-of-interest;
        searching a default view angle from a mapping table based on the category;
        determining a current view angle associated with the object-of-interest; and
        analyzing, based on a threshold value, the default view angle and the current view angle.

13. The method of claim 12, wherein the first predetermined location is a geographic center of the adjusted image, and wherein the second predetermined location is a geographic center of the re-adjusted image.

14. The method of claim 12, wherein the desirable view angle of the object of interest includes a vertical view angle.

15. The method of claim 12, wherein the movement of the object of interest is determined in response to a rotation sensed by the tilt sensor, and wherein the tilt sensor generates the dip angle signal in response to the rotation.

* * * * *

UNITED STATES PATENT AND TRADEMARK OFFICE
CERTIFICATE OF CORRECTION

PATENT NO. : 9,848,103 B2
APPLICATION NO. : 15/173115
DATED : December 19, 2017
INVENTOR(S) : Shou-chuang Zhang It is certified that error appears in the above-identified patent and that said Letters Patent is hereby corrected as shown below:

In the Specification

In Column 6, Line 62, delete "(90°" and insert -- (-90° --, therefor.

Signed and Sealed this
Fifth Day of November, 2019

Andrei Iancu
*Director of the United States Patent and Trademark Office*